(12) United States Patent
Linsey et al.

(10) Patent No.: US 11,327,819 B1
(45) Date of Patent: May 10, 2022

(54) MICROSERVICES MEDIATION LAYER FOR CANONICAL MESSAGE ALIGNMENT IN COMPLEX MICROSERVICES ENVIRONMENTS

(71) Applicant: Dell Products L.P., Round Rock, TX (US)

(72) Inventors: David J. Linsey, Marietta, GA (US); Lokajit Tikayatray, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/246,859

(22) Filed: May 3, 2021

(51) Int. Cl.
*G06F 9/54* (2006.01)

(52) U.S. Cl.
CPC .............. *G06F 9/546* (2013.01); *G06F 9/542* (2013.01)

(58) Field of Classification Search
CPC .......... G06F 9/4812; G06F 9/54; G06F 9/542; G06F 9/564
USPC .................................................. 719/313, 318
See application file for complete search history.

(56) References Cited

U.S. PATENT DOCUMENTS

| | | | |
|---|---|---|---|
| 7,536,693 B1 | 5/2009 | Manczak et al. | |
| 7,797,409 B1 | 9/2010 | Secer | |
| 9,747,070 B1 | 8/2017 | Mutagi et al. | |
| 10,579,370 B2 | 3/2020 | Gupta | |
| 10,970,067 B1 | 4/2021 | Gupta | |
| 11,115,484 B2 * | 9/2021 | Takahashi | ............... H04L 67/10 |
| 11,228,656 B1 * | 1/2022 | Celestine | ................ G06F 9/546 |
| 11,240,303 B2 * | 2/2022 | Onianwa | ............... H04L 67/327 |
| 2007/0005220 A1 | 1/2007 | Parikh et al. | |
| 2012/0215911 A1 | 8/2012 | Raleigh et al. | |
| 2014/0372986 A1 | 12/2014 | Levin et al. | |
| 2016/0057207 A1 | 2/2016 | Li et al. | |

(Continued)

FOREIGN PATENT DOCUMENTS

WO 2017034789 A1 3/2017

OTHER PUBLICATIONS springboottuttorial.com, "Breaking a Monolith into Microservices—Best Practices and Challenges," https://www.springboottutorial.com/breaking-a-monolith-into-microservices, Feb. 18, 2019, 8 pages.

(Continued)

*Primary Examiner* — Andy Ho
(74) *Attorney, Agent, or Firm* — Ryan, Mason & Lewis, LLP

(57) ABSTRACT

An apparatus comprises at least one processing device comprising a processor coupled to a memory, with the processing device being configured to receive in a microservices mediation layer a plurality of event notifications for respective internal events generated within an application, to extract information comprising at least a subset of an entity type, a key and an action from each of the event notifications, to issue at least one corresponding request to one or more microservices based at least in part on the extracted information, to prepare at least one message based at least in part on one or more responses received from the one or more microservices, and to publish the at least one message to one or more message consumers. The microservices mediation layer is illustratively configured to permit seamless switching between synchronous and asynchronous canonical message formats.

20 Claims, 11 Drawing Sheets

(56) References Cited

U.S. PATENT DOCUMENTS

2017/0063833 A1 3/2017 Colle et al.
2019/0250912 A1 8/2019 Gavisiddappa Kodigenahalli et al.
2020/0042315 A1 2/2020 Gupta

OTHER PUBLICATIONS

S. Bhaskaran, "Migrating Monolithic Applications to Microservices," https://dzone.com/articles/migrating-monolithic-applications-to-microservices, Jan. 7, 2018, 3 pages.

nginx.com, "Refactoring a Monolith into Microservices," https://www.nginx.com/blog/refactoring-a-monolith-into-microservices/, Mar. 8, 2016, 10 pages.

cloud.google.com, "Migrating to Microservices from a Monolithic App," https://cloud.google.com/appengine/docs/standard/go/microservice-migration, Oct. 16, 2019, 2 pages.

martinfowler.com, "How to Break a Monolith into Microservices," https://martinfowler.com/articles/break-monolith-into-microservices.html, Apr. 24, 2018, 10 pages.

docs.aws.amazon.com, "Create a Simple Microservice Using Lambda and API Gateway," https://docs.aws.amazon.com/lambda/latest/dg/with-on-demand-https-example-configure-event-source_1.html, 2019, 3 pages.

L. Cheng et al., "Orpheus: Enforcing Cyber-Physical Execution Semantics to Defend Against Data-Oriented Attacks," Proceedings of the 33rd Annual Computer Security Applications Conference, Dec. 4-8, 2017, 12 pages.

U.S. Appl. No. 17/067,958 filed in the name of Mohammad Rafey filed Oct. 12, 2020, and entitled "Controlling Operation of Microservices Utilizing Association Rules Determined from Microservices Runtime Call Pattern Data."

* cited by examiner

FIG. 7

TABLE NAME: ORDER_HEADER

| ORDER_ID | ORDER_NUMBER | COUNTRY | ORDER_DATE | SHIP_DATE |
|---|---|---|---|---|
| 1 | 12341234 | IN | 1.DEC.2020 | 5.DEC.2020 |

TABLE NAME: ORDER_PAYMENT

| ORDER_ID | ORDER_PRICE | SHIPPING COST | DISCOUNT | TOTAL |
|---|---|---|---|---|
| 1 | 1000 | 100 | 200 | 700 |

TABLE NAME: ORDER_STATUS

| ORDER_ID | STATUS | STATUS_DATE | IS_CURRENT |
|---|---|---|---|
| 1 | BOOKED | 1.DEC.2020 | N |
| 1 | SHIPPED | 5.DEC.2020 | Y |

FIG. 8A

```
{
  "orderId":1,
  "orderNumber":"12341234",
  "country":"IN",
  "orderDate":"1.Dec.2020",
  "shipDate":"5.Dec.2020"
}
```

FIG. 8B

```
{
  "messageHeader":{
    "version":"1.0",
    "messageType":"OrderHeaderEventNotification",
    "messageId":"1234-6DD7-4343-W11E-12WQ21WQ7",
    "messageDateTime":"2020-12-24T03:46:36.336-05:00"
  },
  "messagePayload":{
    "orderId":1,
    "orderNumber":"12341234",
    "country":"IN",
    "orderDate":"1.Dec.2020",
    "shipDate":"5.Dec.2020"
  }
}
```

FIG. 8C

```
{
  {
    "orderId":1,
    "orderNumber":"12341234",
    "country":"IN",
    "orderDate":"1.Dec.2020",
    "shipDate":"5.Dec.2020"
  },
  {
    "orderId":1,
    "orderPrice":"1000",
    "shippingCost":"100",
    "discount":"200",
    "total":"700"
  },
  "status":[
    {
      "orderId":1,
      "status":"Booked",
      "statusDate":"1.Dec.2020",
      "isCurrent":"N"
    },
    {
      "orderId":1,
      "status":"Shipped",
      "statusDate":"5.Dec.2020",
      "isCurrent":"Y"
    }
  ]
}
```

*FIG. 8D*

```
{
   "messageHeader":{
      "version":"1.0",
      "messageType":"OrderHeaderEventNotification",
      "messageId":"1234-6DD7-4343-W11E-12WQ21WQ7",
      "messageDateTime":"2020-12-24T03:46:36.336-05:00"
   },
   "messagePayload":{
      {
         "orderId":1,
         "orderNumber":"12341234",
         "country":"IN",
         "orderDate":"1.Dec.2020",
         "shipDate":"5.Dec.2020"
      },
      {
         "orderId":1,
         "orderPrice":"1000",
         "shippingCost":"100",
         "discount":"200",
         "total":"700"
      },
      "status":[
         {
            "orderId":1,
            "status":"Booked",
            "statusDate":"1.Dec.2020",
            "isCurrent":"N"
         },
         {
            "orderId":1,
            "status":"Shipped",
            "statusDate":"5.Dec.2020",
            "isCurrent":"Y"
         }
      ]
   }
}
```

MICROSERVICES MEDIATION LAYER FOR CANONICAL MESSAGE ALIGNMENT IN COMPLEX MICROSERVICES ENVIRONMENTS

FIELD

The field relates generally to information processing systems, and more particularly to techniques for implementing microservices-related messaging within such systems.

BACKGROUND

Applications are increasingly being developed to utilize microservices, in contrast to traditional "monolithic" architectures. Microservices can be implemented as small, independent and composable services that are accessible through Representational State Transfer (REST) calls, providing significant benefits in terms of innovation, manageability, resiliency and scalability. For example, innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another. Despite these and other advantages of microservices-based applications over traditional monolithic applications, some important problems remain, particularly with regard to messaging in complex microservices environments. For example, conventional messaging techniques utilized in such environments fail to achieve efficient canonical message alignment for different types of microservices messaging.

SUMMARY

Illustrative embodiments of the present invention provide techniques for implementing effective micro-messaging in complex microservices environments. For example, illustrative embodiments provide efficient canonical message alignment between synchronous and asynchronous messaging formats, thereby avoiding excessive message fragmentation, redundancy and overhead, while also allowing consuming applications to seamlessly switch between synchronous and asynchronous interfaces.

In one embodiment, an apparatus comprises at least one processing device comprising a processor and a memory, with the processor being coupled to the memory. The at least one processing device is configured to receive in a microservices mediation layer a plurality of event notifications for respective internal events generated within an application, to extract information comprising at least a subset of an entity type, a key and an action from each of the event notifications, to issue at least one corresponding request to one or more microservices based at least in part on the extracted information, to prepare at least one message based at least in part on one or more responses received from the one or more microservices, and to publish the at least one message to one or more message consumers.

The microservices mediation layer is illustratively configured to permit seamless switching between synchronous and asynchronous canonical message formats.

For example, in some embodiments, the one or more microservices comprise a plurality of synchronous microservices each returning a corresponding synchronous canonical message to the microservices mediation layer in response to a particular one of the issued requests.

The published message in these or other embodiments illustratively comprises an asynchronous canonical message that contains message payloads from respective ones of a plurality of synchronous canonical messages returned by respective synchronous microservices so as to provide canonical message alignment between the synchronous canonical messages and the asynchronous canonical message.

The asynchronous canonical message illustratively carries at least one synchronous canonical message payload that is unmodified from one of the responses received from a corresponding one of the one or more microservices. The asynchronous canonical message illustratively comprises an asynchronous canonical message header in addition to the at least one synchronous canonical message payload.

In some embodiments, issuing at least one corresponding request to one or more microservices based at least in part on the extracted information illustratively comprises issuing multiple requests to respective ones of a plurality of microservices.

Additionally or alternatively, issuing at least one corresponding request to one or more microservices based at least in part on the extracted information illustratively comprises issuing at least one request to an aggregation microservice that issues multiple requests to respective ones of a plurality of microservices.

In some embodiments, the application comprises a database application, the key comprises at least one of a primary key and a foreign key, and a given one of the actions comprises at least one of an insert, an update and a delete. A wide variety of other types of applications, keys and actions can be used in other embodiments.

In some embodiments, the microservices mediation layer is configured to perform one or more windowing operations in conjunction with preparing and publishing the at least one message so as to group together microservice responses relating to respective different event notifications occurring within a specified time period.

In these or other embodiments, the microservices mediation layer illustratively utilizes a caching mechanism in which a time-to-live (TTL) value is assigned to at least portions of the extracted information stored using the caching mechanism, and at least a subset of the issuing, preparing and publishing are performed responsive to occurrence of an expiration event relating to the assigned TTL value.

Additionally or alternatively, the microservices mediation layer is illustratively configured to coordinate different windowing operations performed by different messaging publishing entities in preparing and publishing a single message conveying information that would otherwise be separately provided by the different message publishing entities.

In some embodiments, publishing the at least one message to one or more message consumers illustratively comprises associating the message with a designated topic in a topic-based publisher-subscriber messaging model. Other types of message publication techniques can be used in other embodiments.

These and other illustrative embodiments include, without limitation, methods, apparatus, networks, systems and processor-readable storage media.

BRIEF DESCRIPTION OF THE DRAWINGS

FIG. 7 shows an example data set used in an illustrative embodiment.

FIGS. 8A, 8B, 8C and 8D show example message portions in illustrative embodiments, utilizing the data set of FIG. 7.

DETAILED DESCRIPTION

Figure 1:
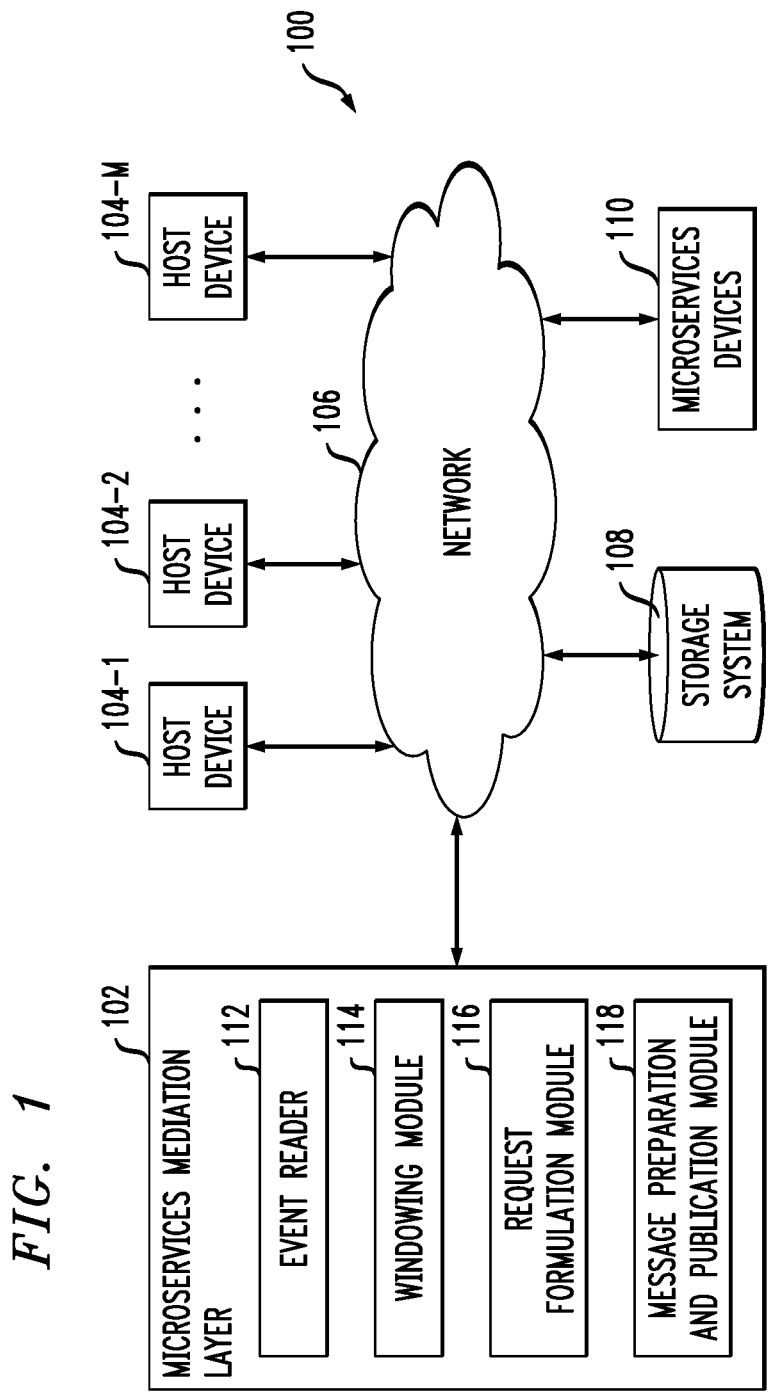
FIG. 1 is a block diagram of an information processing system that includes a microservices mediation layer in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As part of the widespread move toward micro applications, application development teams often find themselves needing to provide their clients with access to their data sources in different lenses via synchronous and asynchronous means.

A common struggle, especially in complex, high-volume ecosystems, is ensuring integration message canonicals are standardized. Too many canonical messages due to too many lenses on the data, and the ecosystem becomes fragmented and costly to maintain. Too few and the bulk of the data gathered and communicated is wasted overhead. Additionally, client applications themselves are often amid transformation and want the flexibility to transition between verbose and thinner canonical messages, and between synchronous and asynchronous protocols.

Illustrative embodiments disclosed herein address these problems by leveraging a canonical message design and implementation pattern which enables tight alignment between protocols across different levels of verbosity, reducing likelihood of canonical message fragmentation and allowing seamless transition for clients at their own pace.

For years most application development has been built around monolithic applications and databases which in turn produce monolithic canonical messages. This has allowed application developers, both producers and consumers, to become lax in their design patterns for interfaces.

The transition to micro applications, while beneficial from a maintainability and time to market perspective, has introduced pressures on these do-everything patterns. Pulling back all data that was in the prior monolithic application now requires requesting information from multiple interfaces and/or applications. Additionally, applications are transitioning at their own pace, often requesting backwards compatibility.

The industry solution to this problem is aggregation services, also known as backends for frontends (BFFs). While this works well for synchronous operations, this pattern on the surface does not help address asynchronous interfaces which bring their own unique challenges, especially with complex aggregations. Large ecosystems may also have separate feature teams or team members working specifically on asynchronous communication due to the different technical skills required. All this together typically results in a different look and feel between synchronous and asynchronous interfaces within these types of ecosystems.

Illustrative embodiments disclosed herein provide an efficient way to ensure canonical message alignment for equivalent operations no matter the protocol. This allows consuming applications to have the benefit of different levels of canonical message verbosity (microservice vs monolith) whether synchronous or asynchronous, and seamlessly switch between synchronous and asynchronous interfaces. It also reduces the development overhead for maintaining double sets of canonicals.

These and other embodiments advantageously provide a methodology for addressing the problem of asynchronous canonical message alignment in a micro application environment, reducing or eliminating fragmentation and allowing consuming applications to seamlessly switch between synchronous and asynchronous protocols.

In some embodiments, this illustratively involves implementing a microservices mediation layer between events produced from a source system and the resulting output into queues, topics or other distribution technologies which sends the output to consuming applications. This microservices mediation layer itself calls into the synchronous services produced by the source system and returns the applicable synchronous service canonical as the canonical into the asynchronous feed. As synchronous services change, this will automatically change the asynchronous feed (developers should ensure backwards compatibility or appropriate service versioning as with any interface lifecycle). These asynchronous services may be backed by microservices, and therefore can be micro messages, or can call into synchronous aggregation services and become more monolithic (e.g., exhibit different levels of verbosity). As with any service type, consuming applications may choose what level of detail they require.

FIG. 1 shows an information processing system 100 configured in accordance with an illustrative embodiment. The information processing system 100 is assumed to be built on at least one processing platform configured to implement functionality for canonical message alignment utilizing a microservices mediation layer as disclosed herein.

The information processing system 100 includes a microservices mediation layer 102, which is coupled to host devices 104-1, 104-2, ... 104-M, collectively referred to as host devices 104, via a network 106. Also coupled to the network 106 is a storage system 108 and a plurality of microservices devices 110. The host devices 104 and microservices devices 110 can include, for example, physical and/or virtual computing resources of IT infrastructure of the system 100, such as servers or other types of computers. These and other processing devices referred to herein can be implemented at least in part using virtual computing resources, such as virtual machines (VMs), Linux containers (LXCs), etc. Numerous other operating scenarios involving a wide variety of different types and arrangements of processing nodes are possible, as will be appreciated by those skilled in the art.

The network 106 may comprise, for example, a global computer network such as the Internet, a wide area network (WAN), a local area network (LAN), a satellite network, a telephone or cable network, a cellular network such as a 4G or 5G network, a wireless network such as a WiFi or WiMAX network, or various portions or combinations of these and other types of networks.

The storage system 108 in some embodiments comprises, for example, a scale-out all-flash content addressable storage array or other type of storage array, although a wide variety of different types of storage systems may be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as separate components in FIG. 1, different portions of the information processing system 100, such as microservices mediation layer 102, host devices 104, storage system 108 and microservices devices 110, can be implemented at least in part on a common processing platform. Alternatively, separate processing platforms, each comprising one or more processing devices, can be utilized in implementing these components of the information processing system 100.

In some embodiments, the host devices 104 may implement host agents that are configured for communication with the microservices mediation layer 102. It should be noted that a "host agent" as this term is generally used herein illustratively comprises an automated entity, such as a software entity running on a processing device. Accordingly, a host agent need not be a human entity.

The microservices mediation layer 102 in the FIG. 1 embodiment is assumed to be implemented using at least one processing device of a processing platform. Each such processing device generally comprises at least one processor and an associated memory, and implements one or more functional modules for controlling certain features of the microservices mediation layer 102.

In the FIG. 1 embodiment, the microservices mediation layer 102 implements an event reader 112, a windowing module 114, a request formulation module 116, and a message preparation and publication module 118.

In operation, the microservices mediation layer 102 receives, illustratively from one or more of the host devices 104 over the network 106, a plurality of event notifications for respective internal events generated within at least one application running on one or more of the host devices 104. The event reader 112 of the microservices mediation layer 102 extracts information comprising at least a subset of an entity type, a key and an action from each of the event notifications, although additional or alternative information can be extracted by the event reader 112 in other embodiments.

The microservices mediation layer 102 via its windowing module 114 illustratively performs one or more windowing operations as described below. Such windowing operations need not be performed in other embodiments.

The microservices mediation layer 102 formulates a corresponding request via its request formulation module 116, and issues the corresponding request over the network 106 to one or more microservices based at least in part on the extracted information. The one or more microservices are illustratively provided by one or more of the microservices devices 110.

The microservices mediation layer 102 via its message preparation and publication module 118 prepares at least one message based at least in part on one or more responses received from the one or more microservices over the network 106, and publishes the at least one message to one or more message consumers. The message consumers illustratively include the one or more applications running on the host devices 104, although additional or alternative message consumers can be present in other embodiments.

In some embodiments, the microservices mediation layer 102 is configured to permit seamless switching between synchronous and asynchronous canonical message formats.

For example, the one or more microservices in some embodiments illustratively comprise a plurality of synchronous microservices each returning a corresponding synchronous canonical message to the microservices mediation layer 102 in response to a particular one of the issued requests.

In such an embodiment, the published message illustratively comprises an asynchronous canonical message that contains message payloads from respective ones of a plurality of synchronous canonical messages returned by respective synchronous microservices so as to provide canonical message alignment between the synchronous canonical messages and the asynchronous canonical message.

Additionally or alternatively, the published message illustratively comprises an asynchronous canonical message carrying at least one synchronous canonical message payload that is unmodified from one of the responses received from a corresponding one of the one or more microservices.

In some embodiments of this type, the asynchronous canonical message comprises an asynchronous canonical message header in addition to the at least one synchronous canonical message payload.

In some embodiments, issuing at least one corresponding request to one or more microservices based at least in part on the extracted information comprises issuing multiple requests to respective ones of a plurality of microservices, possibly provided by different ones of the microservices devices 110.

Additionally or alternatively, issuing at least one corresponding request to one or more microservices based at least in part on the extracted information comprises issuing at least one request to an aggregation microservice that issues multiple requests to respective ones of a plurality of microservices. The aggregation microservice is illustratively implemented by a particular one of the microservices devices 110, and is also referred to in the context of other embodiments herein as an "aggregator service."

It is to be appreciated that the internal events for which event notifications are sent to the microservices mediation layer 102 can be generated by any of a wide variety of different applications, in any combination. For example, a given such application can comprise a database application and a given one of the actions extracted by the event reader 112 can include at least one of an insert, an update and a delete. The key extracted by the event reader 112 can comprise, for example, at least one of a primary key and a foreign key, although other types and arrangements of keys can be used.

As indicated above, the microservices mediation layer 102 in some embodiments is configured to perform one or more windowing operations in conjunction with preparing and publishing the at least one message so as to group together microservice responses relating to respective different event notifications occurring within a specified time period.

For example, the microservices mediation layer 102 is illustratively configured to implement a caching mechanism in which a time-to-live (TTL) value is assigned to at least portions of the extracted information stored using the caching mechanism and at least a subset of the issuing, preparing and publishing are performed responsive to occurrence of an expiration event relating to the assigned TTL value.

Additionally or alternatively, the microservices mediation layer 102 is illustratively configured in some embodiments to coordinate different windowing operations performed by different messaging publishing entities in preparing and publishing a single message conveying information that would otherwise be separately provided by the different message publishing entities.

In some embodiments, publishing the at least one message to one or more message consumers comprises associating the message with a designated topic in a topic-based publisher-subscriber messaging model. Other types of messaging models can be utilized by the microservices mediation layer 102 in other embodiments.

It is to be appreciated that the particular arrangement and functionality of the microservices mediation layer 102, and its associated event reader 112, windowing module 114, request formulation module 116, and message preparation and publication module 118 as illustrated in the FIG. 1 embodiment and described above, are presented by way of example only, and alternative arrangements can be used in other embodiments. For example, the functionality associated with the event reader 112, windowing module 114, request formulation module 116, and message preparation and publication module 118 in other embodiments may be combined into fewer modules, or separated across more modules with the multiple modules possibly being implemented with multiple distinct processors or processing devices.

At least portions of the event reader 112, windowing module 114, request formulation module 116, and message preparation and publication module 118 may be implemented at least in part in the form of software that is stored in memory and executed by a processor.

It is to be understood that the particular set of elements shown in FIG. 1 for canonical message alignment in complex microservices environments is presented by way of illustrative example only, and in other embodiments additional or alternative elements may be used. Thus, another embodiment may include additional or alternative systems, devices and other network entities, as well as different arrangements of modules and other components.

The microservices mediation layer 102 and other portions of the system 100 may be part of cloud infrastructure as will be described in further detail below. The cloud infrastructure hosting the microservices mediation layer 102 may also host one or more of the host devices 104, the storage system 108 and the microservices devices 110.

The microservices mediation layer 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The microservices mediation layer 102, host devices 104, storage system 108 and microservices devices 110 or components thereof may be implemented on respective distinct processing platforms, although numerous other arrangements are possible. For example, in some embodiments at least portions of the microservices mediation layer 102 and one or more of the host devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the microservices mediation layer 102, host devices 104, storage system 108, and microservices devices 110, or portions or components thereof, to reside in different data centers. Numerous other distributed implementations are possible across various arrangements of compute nodes and storage nodes of one or more data centers.

Additional examples of processing platforms utilized to implement the microservices mediation layer 102 and other portions of the system 100 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for canonical message alignment in complex microservices environments will now be described in more detail with reference to the flow diagram of FIG. 2. It is to be understood that this particular process is only an example, and that additional or alternative processes for canonical message alignment in complex microservices environments may be used in other embodiments.

In this embodiment, the process includes steps 200 through 208. These steps are assumed to be performed by the microservices mediation layer 102 utilizing the event reader 112, the windowing module 114, the request formulation module 116, and the message preparation and publication module 118. The process is an example of an algorithm implemented by these modules of the microservices mediation layer 102 in an illustrative embodiment.

In step 200, internal events are detected. The internal events are illustratively generated by an application running on one or more of the host devices 104 as data are inserted, updated and deleted in a database that comprises logical units (LUNs) or other logical storage volumes of the storage system 108. The application illustratively comprises a database application running on one or more of the host devices 104. Upon detection of the internal events on one or more of the host devices 104, corresponding event notifications are sent to the microservices mediation layer 102 over the network 106.

In step 202, the event reader 112 of the microservices mediation layer 102 reads entity type, primary key, and one or more actions, and possibly additional or alternative information, from the corresponding event notifications.

In step 204, specified windowing operations, if any, are performed utilizing the windowing module 114 of the microservices mediation layer 102. Examples of such windowing operations are described in more detail elsewhere herein.

In step 206, requests are formulated in the request formulation module 116 of the microservices mediation layer 102 and issued by the microservices mediation layer 102 over the network 106 to one or more microservices that are provided by one or more of the microservices devices 110. Corresponding responses to the requests are received in the microservices mediation layer 102 from the one or more microservices.

In step 208, the message preparation and publication module 118 of the microservices mediation layer 102 prepares and publishes one or more messages that include the microservice responses.

Figure 2:
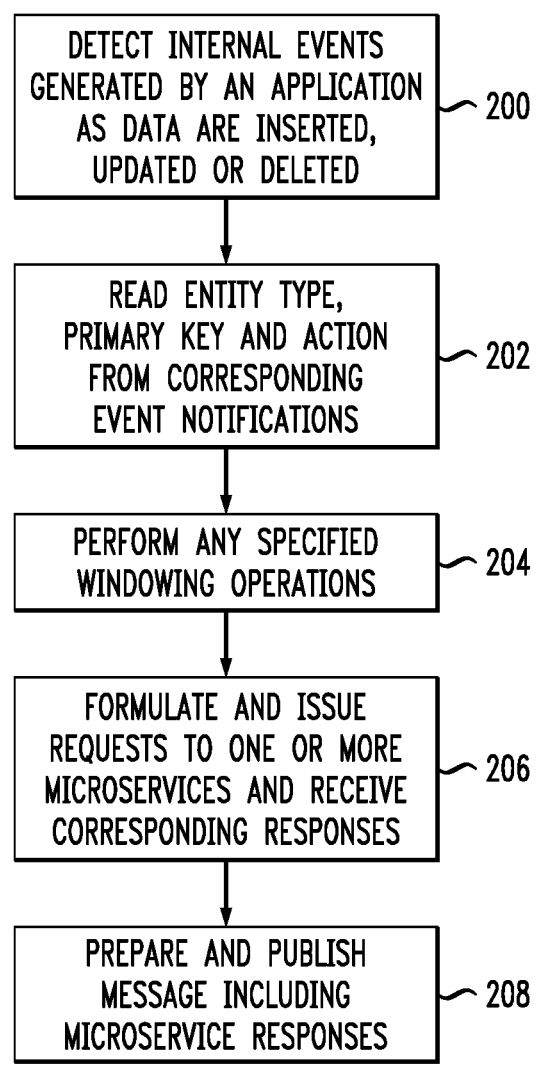
FIG. 2 is a flow diagram of an exemplary process performed at least in part by a microservices mediation layer in an illustrative embodiment.

Multiple instances of the FIG. 2 process are illustratively performed at least in part in parallel with one another for different sets of internal events generated by one or more applications running on the host devices 104.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for microservices mediation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different microservices mediation arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3 and 4, which show respective example message publication flows without use of an aggregator service and with use of aggregator service.

Figure 3:
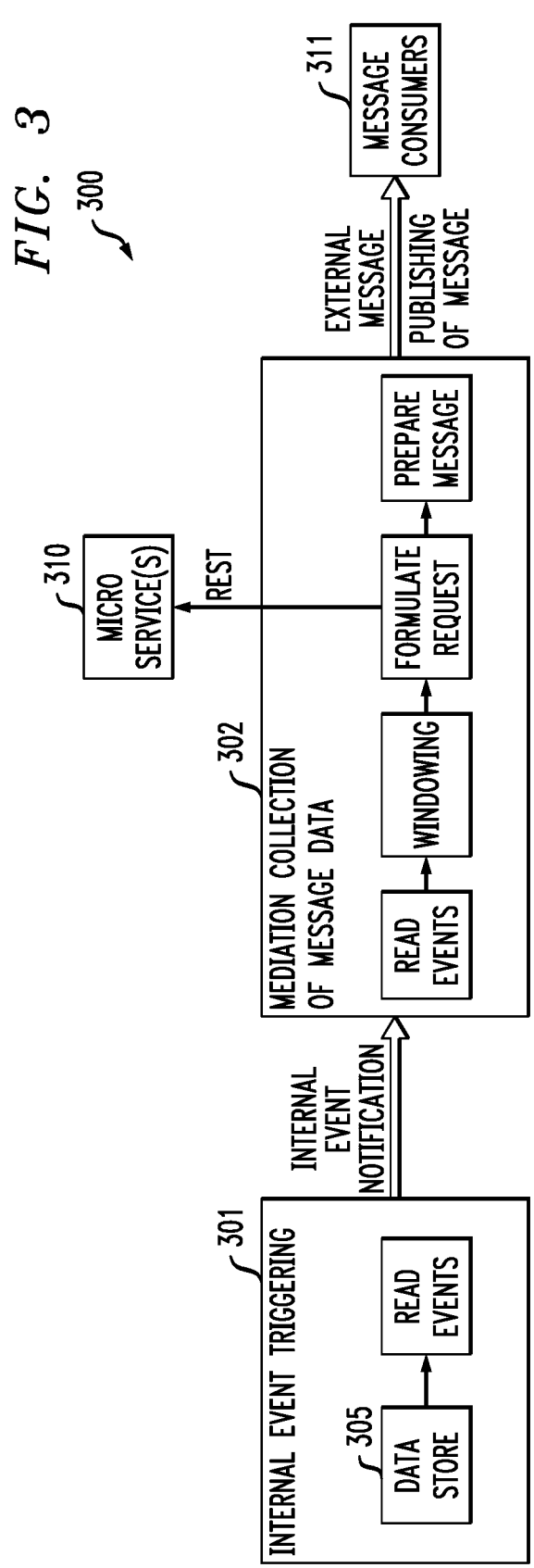
FIG. 3 shows an example message publication flow without the use of an aggregator service in an illustrative embodiment.

Referring now to FIG. 3, an example implementation of a micro publisher flow without use of an aggregator service is shown. The micro publisher flow is an illustration of what is more generally referred to herein as a "message publication flow," and a wide variety of other types of message publication flows can be used in other embodiments. The micro publisher flow in this illustrative embodiment is implemented in an information processing system 300 that includes a monitored system 301, a microservices mediation layer 302, one or more microservices devices 310 and a plurality of message consumers 311.

The monitored system 301 more particularly comprises a datastore 305 that illustratively comprises one or more databases. Events relating to the datastore 305 are read using internal event triggering functionality of the monitored system 301 to generate corresponding event notifications that are sent to the microservices mediation layer 302.

The microservices mediation layer 302 implements mediation collection of message data utilizing modules such as event reader 112, windowing module 114, request formulation module 116, and message preparation and publication module 118, as previously described in conjunction with the embodiments of FIGS. 1 and 2. This illustratively includes reading events, performing windowing operations, formulating requests to one or more microservices provided by the one or more microservices devices 310, and preparing messages that are published to message consumers 311.

The micro publisher flow in this example is illustratively described as comprising a plurality of steps, denoted as Step 0 through Step 3, as set forth below.

Step 0: Internal Event Triggering

Events from within a micro application associated with datastore 305 are produced as data is inserted, updated or deleted. This example solution is compatible with any notification pattern which could include database-level transaction log mining or application-level notifications. All that is required to be notified in this illustrative embodiment is the entity (e.g., "order"), entity primary key (e.g., "1234") and action (e.g., insert, update or delete). Many enterprise applications may already be producing such notifications internally as part of data replications or backups for disaster recovery, high availability, or data warehousing.

This internal event notification is ultimately routed to and consumed by the next step.

Step 1: Mediation Collection of Message Data

Illustrative embodiments provide a microservices mediation layer at this step in the process which consumes the internal event notification from the prior step. The microservices mediation layer should be as close as possible to the micro application from both a physical perspective and a team ownership perspective, as it is effectively an extension of the micro application itself.

The microservices mediation layer is illustratively configured to read the entity type, primary key and action from the internal event notification, and to formulate a request to the appropriate synchronous service(s) to gather up the required data. Headers are added as deemed necessary (e.g., message version, message ID, entity type, action and ID) but the message payload itself is unmodified from what is returned from the synchronous service it is mapped to.

It is important for the microservices mediation layer to be prior to the fan out of the published message to avoid excessive numbers of redundant callbacks to the synchronous service.

Step 2: Publishing of Message

After collection of the data via canonical messages from the appropriate synchronous service, the message is published out by the microservices mediation layer via a selected asynchronous messaging mechanism.

Step 3: Additional Canonical Message Triggering & Other Considerations

Multiple internal events may be triggered from a single business event within the ecosystem. For example, creating a new order may result in inserting an order plus order line items, each producing its own internal events. Windowing, which in some embodiments herein refers to the practice of a publisher grouping together multiple events for the same entity within a specific time period, can be used to reduce the "chattiness" of messages depending on the acceptable staleness for the given use case.

In a similar manner, multiple messages to consumers may be generated from a single business event. Using the same prior example of a new order with order lines, the order line micro message may be triggered in addition to a complete order aggregated canonical message. This allows consumers to select the level of verbosity they want in their asynchronous messages just like would be done for synchronous calls.

Lastly, this embodiment results in the possibility of a single canonical message (especially an aggregate canonical message) being produced by multiple publishers. If an existing order with order lines and associated payment information has one of the order lines updated along with payment information (perhaps due to a pricing adjustment), the order line micro message plus payment micro message may need to be communicated along with the overall order aggregated canonical message. If the order line and payment publishers both also publish the aggregated canonical message this can result in redundant messages sent. If this is a concern, micro publishers (such as order lines and order payment publishers) can notify another publisher (order aggregation) which will de-duplicate these inbound events based on its own windowing just as the micro publishers did from the original internal events resulting in only a single aggregated canonical message being communicated in a given window no matter how many micro publisher changes there were.

Figure 4:
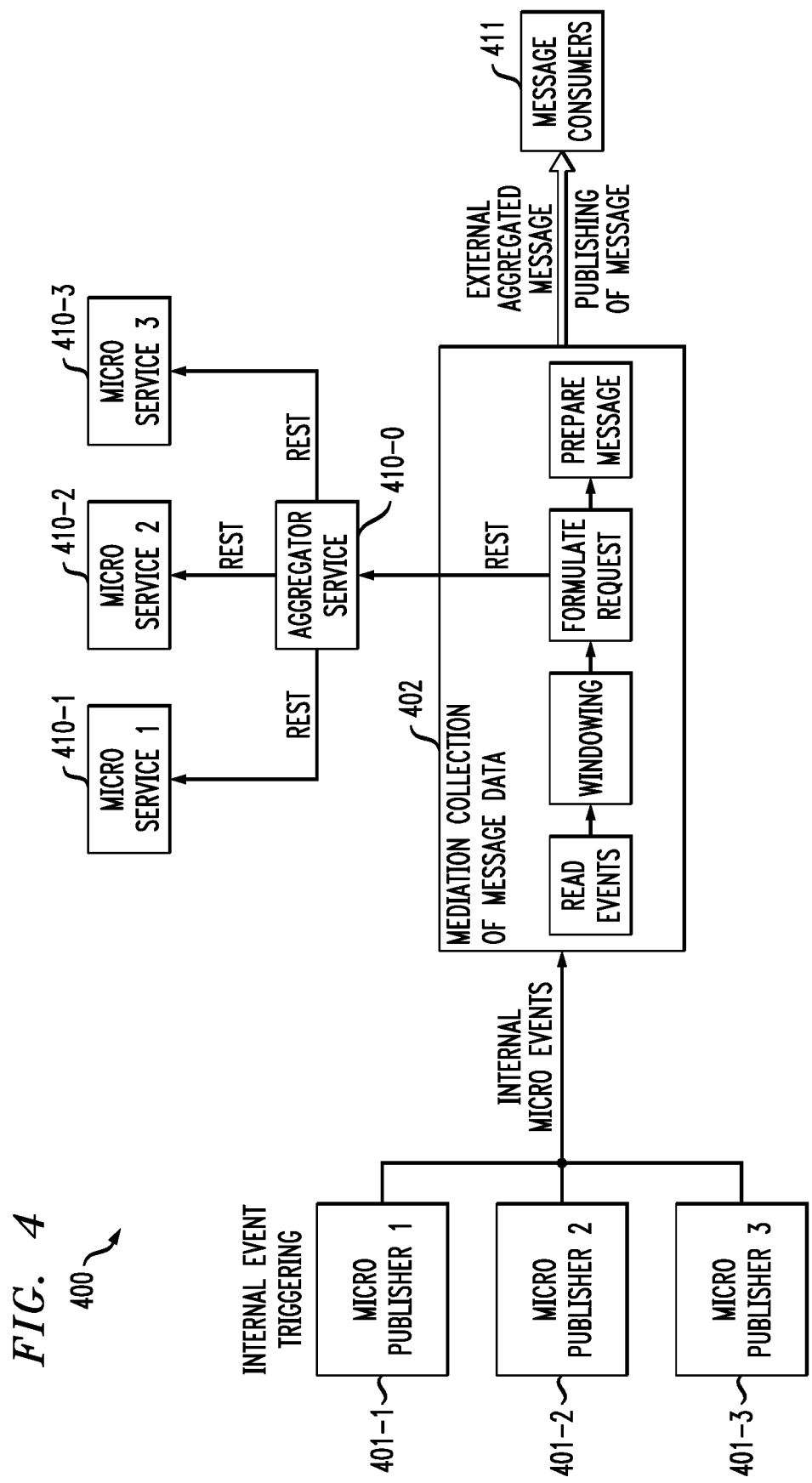
FIG. 4 shows an example message publication flow with the use of an aggregator service in an illustrative embodiment.

Turning now to FIG. 4, an example implementation of an aggregation publisher flow in an illustrative embodiment is shown. The aggregation publisher flow is another illustration of what is more generally referred to herein as a "message publication flow." The aggregation publisher flow in this illustrative embodiment is implemented in an information processing system 400 that includes a plurality of micro publishers 401-1, 401-2 and 401-3, a microservices mediation layer 402, an aggregator service device 410-0, multiple microservices devices 410-1, 410-2 and 410-3, and a plurality of message consumers 411. The aggregator service performed by aggregator service device 410-0 may itself be implemented as a microservice.

The micro publishers 401 in some embodiments are associated with one or more monitored systems, such as the monitored system 301 of the FIG. 3 embodiment. The micro publishers 401 utilize their internal event triggering functionality to generate internal micro events for delivery to the microservices mediation layer 402.

The microservices mediation layer 402 implements mediation collection of message data utilizing modules such as event reader 112, windowing module 114, request formulation module 116, and message preparation and publication module 118, as previously described in conjunction with the embodiments of FIGS. 1 and 2. This illustratively includes reading events, performing windowing operations, formulating requests to the aggregator service device 410-0, and preparing messages that are published to message consumers 411.

As explained above, windowing can help a publisher to group together multiple events for the same entity within a specific time period. This can be used to reduce the chattiness of messages depending on the acceptable staleness for the given use case. Windowing should be used if there is a need for reducing the "chattiness" of the messages, and in other embodiments a real-time or "live" message feed may be used.

To implement windowing, the microservices mediation layer 402 can utilize a caching mechanism. When a message is received for an entity which needs to be published only after a certain period of windowing, the microservices mediation layer can store the internal message into a cache. The data in the cache should be configured with a time-to-live (TTL) parameter based on how much window time the application team wants. Once the cached data TTL expires, it will trigger an internal processing to proceed with formulating a request to the appropriate synchronous services, creating a corresponding external message and publishing the message to the external topic (as explained in Step 1 above).

The TTL setting for the message in the cache should be set keeping the stale data tolerance of the consumer systems in mind. The TTL setting should be large enough to accommodate most of the consecutive updates on the entity in the database so that duplicate messages can be avoided to the maximum possible extent. Also, the TTL setting should be small enough to not leave the consuming application with stale data for long. The TTL parameter should be dynamically configurable for the microservices mediation layer.

Figure 5:
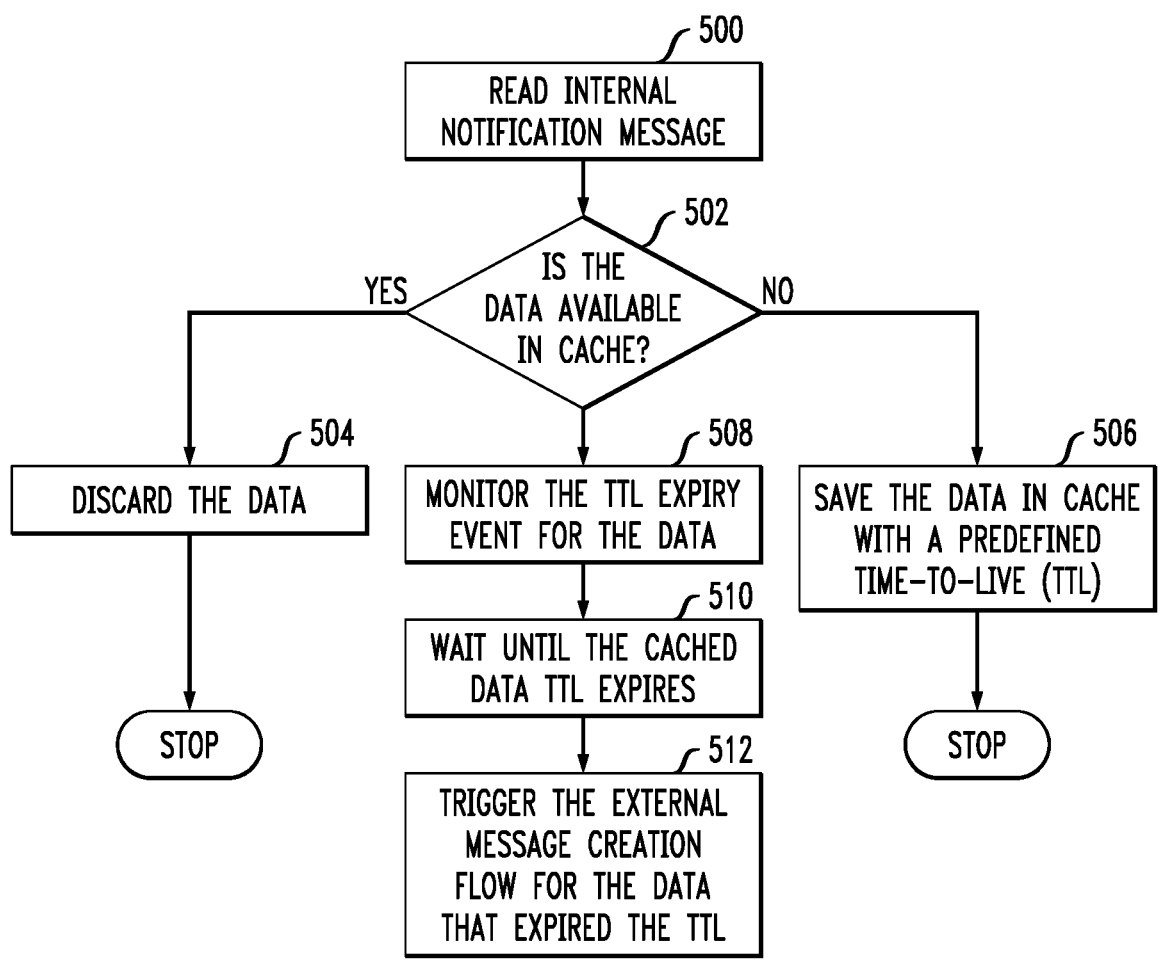
FIG. 5 is a flow diagram showing an example windowing arrangement utilizing TTL values in an illustrative embodiment.

FIG. 5 shows an example implementation of a windowing flow in an illustrative embodiment. The windowing flow in this embodiment comprises steps 500 through 512, although it is to be appreciated that additional or alternative steps can be used in other embodiments. Also, the particular ordering of the steps is exemplary only, and can be varied in other embodiments. For example, portions of the particular sequence of steps can be varied from the ordering shown in the figure, with one or more steps being performed at least in part in parallel with one or more other steps. The steps are illustratively performed primarily by a microservice mediation layer, such as microservices mediation layer 102, 302 or 402 of the respective embodiments of FIGS. 1, 3 and 4.

In step 500, an internal notification message is read by the microservices mediation layer.

In step 502, a determination is made as to whether or not the corresponding data is available in cache. If the data is available in cache, the process moves to step 504, and otherwise moves to step 506, as shown in the figure.

In step 504, which is reached if the data is available in cache, the corresponding data read from the notification is discarded, and the process temporarily stops until a TTL expiry event occurs, as described below.

In step 506, which is reached if the data is not available in cache, the corresponding data read from the notification is saved in cache with a predefined TTL, and the process temporarily stops until a TTL expiry event occurs, as described below.

Accordingly, after performance of either step 504 or 506 for a given internal notification message, step 508 continues to be performed in the background.

In step 508, monitoring for a TTL expiry event for the data continues.

In step 510, the waiting for the TTL expiry event continues until the cached data TTL expires.

In step 512, responsive to this TTL expiry event, the external message creation flow is triggered for the data that experienced the TTL expiry event.

Multiple instances of the FIG. 5 process are illustratively performed for respective instances of different notification messages that are subject to windowing operations.

The above-described embodiments efficiently implement a micro-messaging model. Through the combination of connecting internal change events to specific publishers and mapping of microservices to those publishers, illustrative embodiments disclosed herein establish a controlled, scalable and efficient pipeline for communicating asynchronous change events to consumers. Such embodiments can also chain on additional publishers via event cascade which in turn can be used as aggregation publishers in a similar manner as microservice aggregation (e.g., backend-for-frontend) providing the same benefits of synchronous service architecture to asynchronous architecture.

Illustrative embodiments also ensure automatic canonical conformance. The mapping of publishers to specific synchronous services for generating message payloads drives tight and automatic alignment of canonical message formats, reducing the technical effort and complexity which often results from having separate canonical message definitions across synchronous and asynchronous interfaces. As synchronous interfaces change, asynchronous interfaces are kept up to date further reducing technical investment. This aspect also benefits consumers as they can seamlessly transition between protocols due to no differences in the body of the message.

Additional examples will now be described with reference to FIGS. 6 through 8.

Figure 6:
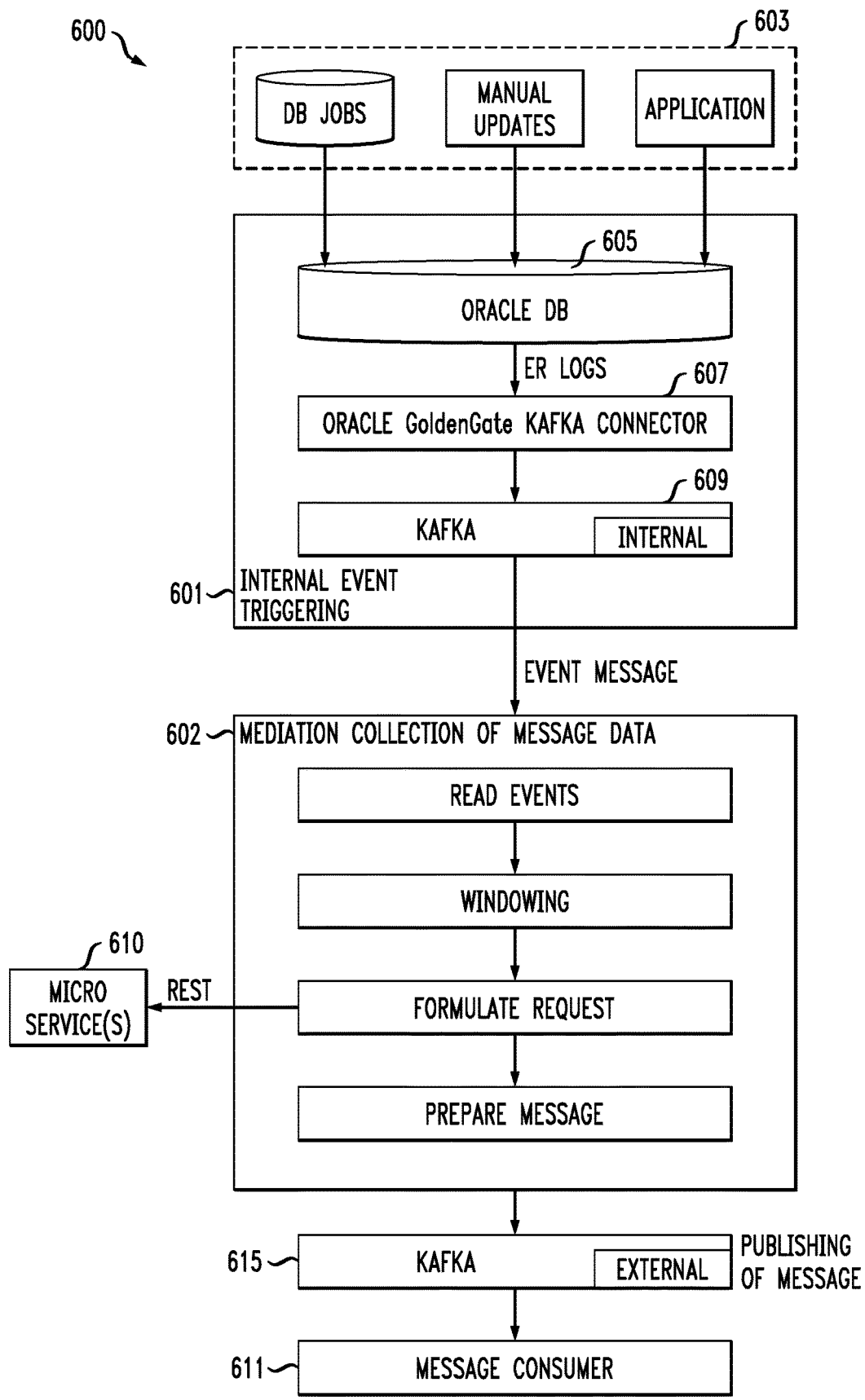
FIG. 6 shows an example message publication flow for events generated by a database application in an illustrative embodiment.

FIG. 6 shows an example message publication flow for events generated by a database application in an illustrative embodiment. The message publication flow in this illustrative embodiment is implemented in an information processing system 600 that includes a monitored system 601, a microservices mediation layer 602, one or more microservices devices 610 and a plurality of message consumers 611.

The monitored system 601 more particularly comprises an Oracle database 605 that is accessed by outside components 603 that include applications, manual updates and database (DB) jobs as shown.

Events relating to the database 605 are read using internal event triggering functionality of the monitored system 601 to generate corresponding event notifications that are sent to the microservices mediation layer 602. This involves utilization of a connector 607 and an internal Kafka message publisher 609. The connector 607 is illustratively implemented as an ER-Kafka connector, comprising a plugin configured as a tool for database transaction tracking and publishing the event as an internal message, where ER denotes entity replication, and Kafka denotes the queue technology used to transfer the message to the microservices mediation layer 602. The ER-Kafka connector in this embodiment more particularly comprises an Oracle Golden Gate Kafka connector, configured to move events from the database 605 to Kafka topics of the internal Kafka message publisher 609.

The microservices mediation layer 602 implements mediation collection of message data utilizing modules such as event reader 112, windowing module 114, request formulation module 116, and message preparation and publication module 118, as previously described in conjunction with the embodiments of FIGS. 1 and 2. This illustratively includes reading events, performing windowing operations, formulating requests to one or more microservices provided by the one or more microservices devices 610, and preparing messages that are published to message consumers 611. The publication by the microservices mediation layer 602 in this embodiment is performed via an external Kafka message publisher 615.

FIG. 7 shows an example of an order management data set used to illustrate the operation of some embodiments, as described below.

Example 1—Micro Publisher Flow

In the example data set, assume there is a new order record created in the Order_Header table with Order_Id=1. Order_Id is the primary key (PK) for the record.

1. The insert transaction on the database will create an event.

2. The transaction can be tracked by the ER-Kafka tool and can create an internal event message that will carry the PK of the record, i.e., Order_Id (1), and the Action (Insert).

3. A listener can listen to the internal event message and will form a request to make a synchronous REST call to an Order microservice.

4. The microservice will return a JavaScript Object Notation (JSON) response with required Order data for the given Order_Id (1).

FIG. 8A shows the JSON response.

5. The JSON response from the microservice will be wrapped with an asynchronous message header, as shown in FIG. 8B.

It should be noted that the messagePayload section is an exact copy of the REST microservice response. This ensures automatic canonical message conformance.

6. The final asynchronous message can be sent out through a Kafka topic.

There is no modification to the REST microservice response structure. The final message that goes out in the Kafka topic contains the exact same field names and message structure as the microservice response. The entire process efficiently implements a micro-messaging model. Any consumer that needs only the order header will get the required details without having to read and parse through payment or order status data.

Additionally, due to the identical nature of the message canonical between the synchronous service in step 4 and the asynchronous message in step 5, any changes within the synchronous service in step 4 will be automatically reflected in the messagePayload section of the asynchronous message. This also means a given client can seamlessly move between the two message formats, being confident the core payload is the same between both.

Example 2—Aggregation Publisher Flow

In the example data set, assume there is a consumer which needs all the details about an order, including order header, payment and status information, irrespective of which of these entities got added or updated.

1. The insert/update transactions on the database will create events.

2. The transactions can be tracked by ER-Kafka tool and can create internal event messages that will carry the PK of the record, i.e., Order_Id (1), and the Action (Insert). Such a message can include one or more additional or alternative keys, such as a foreign key (FK).

3. Each individual listener can listen to their respective internal event message and produce a micro message as described in the earlier section, and afterward can decide to cascade the message further by forwarding the internal event message to another publisher via a mechanism such as a Kafka topic.

4. A new listener can listen to the cascaded message and will form a request to make a synchronous REST call to an aggregator service.

5. The aggregator REST service in turn will make REST calls to the required microservices for the respective entities.

6. Each microservice will return a JSON response with their respective data for the given Order_Id (1).

7. Aggregator service collates the multiple microservice responses and forms a single JSON response without modifying the field names or individual response structure.

FIG. 8C shows the JSON response.

8. The JSON response from the aggregator service will be wrapped with an asynchronous message header, as shown in FIG. 8D.

It should be noted that the messagePayload section is exact copy of the REST aggregator service response. This ensures automatic canonical conformance.

9. Final asynchronous aggregated message can be sent out through an asynchronous transport technology, for example a Kafka topic.

In this example, there is no modification to the REST aggregator service response structure. The final message that goes out to the destination contains the exact same field names and message structure as the aggregator service response which in turn is exactly the same as the respective microservice responses. The entire process efficiently implements a micro-messaging model. Any consumer that needs the complete order details gets the details in single message without any change to individual microservices or individual micro messages.

Example 3—Windowing of Events

Extending Example 2 above, in some embodiments it may not be desirable to publish an order aggregation message for insert/update into every table (i.e., order header, payment and status information) instantly. If one were to do that, then a single order creation will trigger an aggregation message for each transaction, i.e. insert into order header, payment and status information. All the messages for a single order will ultimately contain the same aggregated information when it calls the aggregation REST service for forming the message. Thus, it will send out a duplicate/repeated message.

To avoid such duplicate/repeated messages, windowing functionality is implemented in the message creation logic. Windowing can introduce a preset delay, post which the process can consolidate the PK (Order_Id(1)) from various table events. Finally, one single aggregated message can be created per unique Order_Id (1). This will reduce the number of duplicate messages which carries the exact same data.

A caching technique is used to implement the windowing functionality in the present embodiment, as follows.

1. Every event can store the Order_Id (1) available in the internal event message into the cache, instead of calling the REST service immediately.

2. While storing into the cache, only the Order_Id (1) will be stored. Hence, if the same order related data (with Order_Id=1) have been transacted multiple times across the same or different tables, within the preset duration, the Order_Id (1) will be stored only one time.

3. After every 1 minute (or any predefined duration), a poller component can be used to pull the data from cache, produce and publish the aggregated message.

4. Simultaneously the Order_Id (1) can be deleted from the cache to indicate that the message related to the Order_Id (1) has been successfully sent out to the destination.

It is to be appreciated that the foregoing examples are presented for purposes of illustration only, and additional or alternative steps, possibly performed in different orders or at least in part in parallel with one another, can be used.

In some embodiments, Kafka is used to provide a messaging channel, although other messaging channels can be used. For example, RabbitMQ, IBM MQ and others can also perform fan out of messages in publisher-subscriber messaging models. However, Kafka is utilized in illustrative embodiments due to its advantageous features, including the following:

Volume—Kafka can comfortably process much larger amounts of messaging volume than other messaging platforms. Hence there is no performance implication or message overflow/lost scenario during heavy load periods.

Retention Period—Kafka can store the message for a predefined period irrespective of whether or not some of the consumers have consumed the message.

Partition—A Kafka topic can have multiple partitions to store the data. The number of partitions can be increased or decreased depending on the speed of message consumption by the consuming applications.

Additionally or alternatively, some embodiments utilize an ER-Kafka connector. For example, in the case of an Oracle database, Oracle's Golden Gate connector for Kafka is utilized to move the events from the database to the Kafka topics, as previously described in conjunction with the embodiment of FIG. 6.

In embodiments that utilize windowing, the caching portion of the windowing functionality can be implemented using any caching service, such as Redis. The TTL for the messages should not be more than few seconds to avoid stale data at the consumer end.

With regard to service retries, microservice calls in the microservices mediation layer should have automatic retry for service call failures that are retriable (e.g., service call failures due to network error). This will help in avoiding message compilation failure during intermittent failures.

Also, with regard to message read commit, message reads from internal notification topics should only be committed if the process succeeds to build the external message and drops it into external message queue.

As indicated above, illustrative embodiments provide significant advantages over conventional techniques.

For example, illustrative embodiments efficiently implement a micro-messaging model. Through the combination of connecting internal change events to specific publishers and mapping of microservices to those publishers, illustrative embodiments establish a controlled, scalable and efficient pipeline for communicating asynchronous change events to consumers. Such embodiments can also chain on additional publishers via event cascade which in turn can be used as aggregation publishers in a similar manner as microservice aggregation (e.g., backend-for-frontend) providing the same benefits of synchronous service architecture to asynchronous architecture.

Moreover, illustrative embodiments also ensure automatic canonical conformance. The mapping of publishers to specific synchronous services for generating message payloads drives tight and automatic alignment of canonical message formats, reducing the technical effort and complexity which often results from having separate canonical message definitions across synchronous and asynchronous interfaces. As synchronous interfaces change, asynchronous interfaces are kept up to date further reducing technical investment. This aspect also benefits consumers as they can seamlessly transition between protocols due to no differences in the body of the message.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for canonical message alignment in complex microservices environments will now be described in greater detail with reference to FIGS. 9 and 10. Although described in the context of system 100, these platforms may also be used to implement at least portions of other information processing systems in other embodiments.

Figure 9:
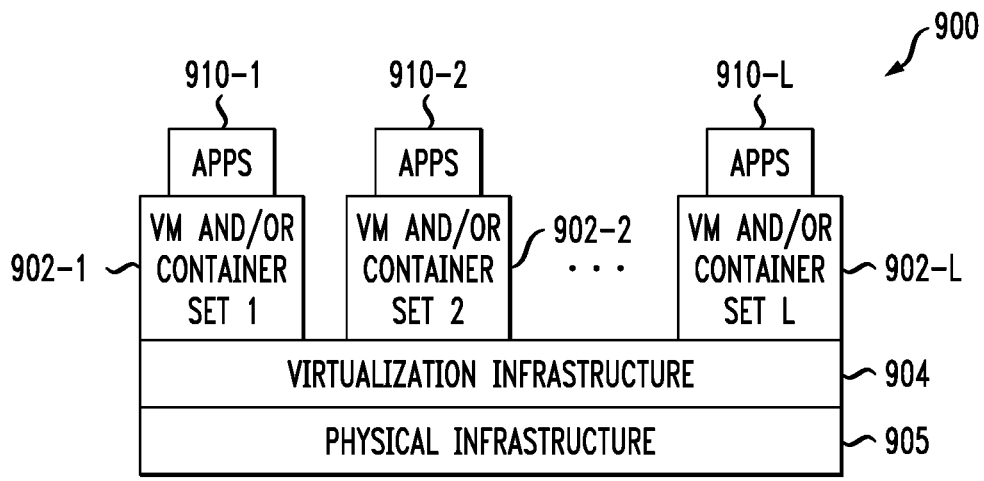
FIGS. 9 and 10 show examples of processing platforms that may be utilized to implement at least a portion of an information processing system in illustrative embodiments.
Figure 10:
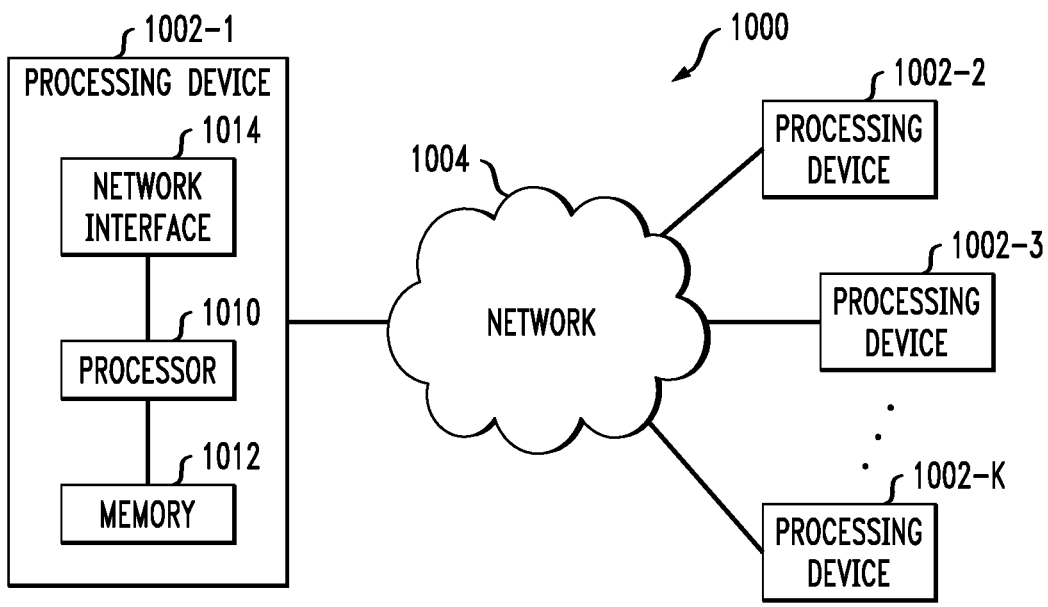

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, ... 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, ... 910-L running on respective ones of the VMs/container sets 902-1, 902-2, ... 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, ... 1002-K, which communicate with one another over a network 1004.

The network 1004 may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for canonical message alignment in complex microservices environments as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing devices, applications, microservices, microservices mediation layers, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   receiving in a microservices mediation layer a plurality of event notifications for respective internal events generated within an application;
   extracting information comprising at least a subset of an entity type, a key and an action from each of the event notifications;
   issuing at least one corresponding request to one or more microservices based at least in part on the extracted information;
   preparing at least one message based at least in part on one or more responses received from the one or more microservices; and
   publishing the at least one message to one or more message consumers.

2. The apparatus of claim 1 wherein the microservices mediation layer is configured to permit seamless switching between synchronous and asynchronous canonical message formats.

3. The apparatus of claim 1 wherein the one or more microservices comprise a plurality of synchronous microservices each returning a corresponding synchronous canonical message to the microservices mediation layer in response to a particular one of the issued requests.

4. The apparatus of claim 1 wherein the published message comprises an asynchronous canonical message that contains message payloads from respective ones of a plurality of synchronous canonical messages returned by respective synchronous microservices so as to provide canonical message alignment between the synchronous canonical messages and the asynchronous canonical message.

5. The apparatus of claim 1 wherein the published message comprises an asynchronous canonical message carrying at least one synchronous canonical message payload that is unmodified from one of the responses received from a corresponding one of the one or more microservices.

6. The apparatus of claim 5 wherein the asynchronous canonical message comprises an asynchronous canonical message header in addition to said at least one synchronous canonical message payload.

7. The apparatus of claim 1 wherein issuing at least one corresponding request to one or more microservices based at least in part on the extracted information comprises issuing multiple requests to respective ones of a plurality of microservices.

8. The apparatus of claim 1 wherein issuing at least one corresponding request to one or more microservices based at least in part on the extracted information comprises issuing at least one request to an aggregation microservice that issues multiple requests to respective ones of a plurality of microservices.

9. The apparatus of claim 1 wherein the application comprises a database application and a given one of the actions comprises at least one of an insert, an update and a delete.

10. The apparatus of claim 1 wherein the key comprises at least one of a primary key and a foreign key.

11. The apparatus of claim 1 wherein the microservices mediation layer is configured to perform one or more windowing operations in conjunction with preparing and publishing the at least one message so as to group together microservice responses relating to respective different event notifications occurring within a specified time period.

12. The apparatus of claim 1 wherein the microservices mediation layer utilizes a caching mechanism in which a time-to-live value is assigned to at least portions of the extracted information stored using the caching mechanism and at least a subset of the issuing, preparing and publishing are performed responsive to occurrence of an expiration event relating to the assigned time-to-live value.

13. The apparatus of claim 1 wherein the microservices mediation layer is configured to coordinate different windowing operations performed by different messaging publishing entities in preparing and publishing a single message conveying information that would otherwise be separately provided by the different message publishing entities.

14. The apparatus of claim 1 wherein publishing the at least one message to one or more message consumers comprises associating the message with a designated topic in a topic-based publisher-subscriber messaging model.

15. A computer program product comprising a non-transitory processor-readable storage medium having stored therein program code of one or more software programs, wherein the program code when executed by at least one processing device causes the at least one processing device to perform steps of:
   receiving in a microservices mediation layer a plurality of event notifications for respective internal events generated within an application;
   extracting information comprising at least a subset of an entity type, a key and an action from each of the event notifications;
   issuing at least one corresponding request to one or more microservices based at least in part on the extracted information;
   preparing at least one message based at least in part on one or more responses received from the one or more microservices; and
   publishing the at least one message to one or more message consumers.

16. The computer program product of claim 15 wherein the microservices mediation layer is configured to permit seamless switching between synchronous and asynchronous canonical message formats.

17. The computer program product of claim 15 wherein the published message comprises an asynchronous canonical message that contains message payloads from respective ones of a plurality of synchronous canonical messages returned by respective synchronous microservices so as to provide canonical message alignment between the synchronous canonical messages and the asynchronous canonical message.

18. A method comprising:
  receiving in a microservices mediation layer a plurality of event notifications for respective internal events generated within an application;
  extracting information comprising at least a subset of an entity type, a key and an action from each of the event notifications;
  issuing at least one corresponding request to one or more microservices based at least in part on the extracted information;
  preparing at least one message based at least in part on one or more responses received from the one or more microservices; and
  publishing the at least one message to one or more message consumers;
  wherein the method is performed by at least one processing device comprising a processor coupled to a memory.

19. The method of claim 18 wherein the microservices mediation layer is configured to permit seamless switching between synchronous and asynchronous canonical message formats.

20. The method of claim 18 wherein the published message comprises an asynchronous canonical message that contains message payloads from respective ones of a plurality of synchronous canonical messages returned by respective synchronous microservices so as to provide canonical message alignment between the synchronous canonical messages and the asynchronous canonical message.

* * * * *